United States Patent [19]

Martin et al.

[11] 3,857,907

[45] Dec. 31, 1974

[54] PROCESS FOR THE MANUFACTURE OF PHOSPHORIC ACID ESTERS AND PHOSPHONIC ACID ESTERS

[76] Inventors: Henry Martin; Jozef Drabek, both of Basel, Switzerland

[22] Filed: Apr. 1, 1970

[21] Appl. No.: 24,853

[30] Foreign Application Priority Data
Apr. 2, 1969 Switzerland............... 5106/69

[52] U.S. Cl........ 260/982, 260/250 R, 260/251 P, 260/290 R, 260/307 D, 260/310 R, 260/326 E, 260/343.2 P, 260/926, 260/938, 260/940, 260/941, 260/943, 260/944, 260/945, 260/964, 260/985

[51] Int. Cl........... C07f 9/08, C07f 9/16, C07f 9/40

[58] Field of Search............ 260/982, 985

[56] References Cited
UNITED STATES PATENTS
3,188,309   6/1965   Mukaiyama et al............ 260/982 X
3,340,333   9/1967   Baranauckas et al........... 260/985

OTHER PUBLICATIONS
Houben-Weyl, Methoden Der Organischen Chemie, Vol. 12/2, Georg Thieme Verlag, (Stuttgart) 1964, page 335.
Kosolapoff, Organophosphorus Compounds, John Wiley & Sons, Inc. (New York) 1950, page 227.

*Primary Examiner*—Lorraine A. Weinberger
*Assistant Examiner*—Richard L. Raymond
*Attorney, Agent, or Firm*—Frederick H. Rabin; Harry Falber; Harry Goldsmith

[57] ABSTRACT

Phosphoric or phosphonic acid esters of the formula

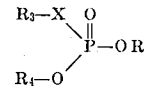

wherein $R_3$ and $R_4$ represent identical or different $C_1$-$C_4$ alkyl radicals and X represents an oxygen atom or the direct P—$R_3$ bond, can be manufactured under mild conditions by reacting

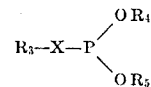

wherein $R_5$ represents a $C_1$-$C_4$-alkyl radical together with bromotrichloromethane and a compound R—OH. R represents any aliphatic, araliphatic or aromatic radical or the radical of an enolised compound or R—OH represents an optionally substituted oximino compound or hydroxylamine.

6 Claims, No Drawings

PROCESS FOR THE MANUFACTURE OF PHOSPHORIC ACID ESTERS AND PHOSPHONIC ACID ESTERS

The present invention provides a process for the manufacture of phosphoric acid esters and phosphonic acid esters of the formula

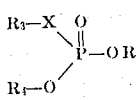
                        I wherein $R_3$ and $R_4$ represent identical or different $C_1$–$C_4$ alkyl radicals and X represents an oxygen atom or the direct P–$R_3$ bond, wherein a compound of the formula $$R - OH$$

wherein R represents an aliphatic, araliphatic or aromatic radical or the radical of an enolised compound or the radical

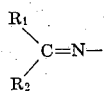

in which one of the radicals $R_1$ or $R_2$ can be a hydrogen atom or the group $-N(R_6)(R_7)$, wherein $R_6$ represents a hydrogen atom or a $C_1$–$C_4$ alkyl group and $R_7$ represents a hydrogen atom, a $C_1$–$C_4$-alkyl or aryl group, and the other of the two radicals $R_1$ and $R_2$, or both radicals $R_1$ and $R_2$, are of organic nature, or wherein R — OH represents a hydroxylamine which is optionally substituted by an alkyl, aryl or acyl radical, is reacted with trichlorobromomethane and a phosphorus compound of formula

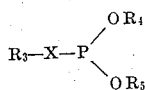

wherein $R_5$ represents a $C_1$–$C_4$-alkyl radical.

In the course of the reaction, $CHCl_3$ and $R_5$—Br are produced together with the desired compounds of formula I.

Trichlorobromomethane may be used as a solvent or as a diluent. In accordance with the end products produced, it is preferably employed in at least stoichiometrically equivalent amounts relative to the two other reagents. In this case another solvent or diluent which is free of hydroxyl groups is used for the reaction, where desired.

Possible substances which may be used as solvents are preferably hydrocarbons, for example, benzene, toluene, xylene, nitrobenzene, chlorobenzene, cyclohexane, n-pentane, n-hexane and petroleum ether mixtures, and also, for example, chloroform, bromoform, methylene chloride, ether, dioxan, tetrahydrofuran, acetonitrile and ethylene glycol dialkyl ethers.

Ketones can be used, provided they do not show any enolisation tendency which interferes with the course of the reaction.

Carbon tetrachloride may also be employed as the solvent. Admittedly it resembles trichlorobromomethane in its mode of action, but its reaction velocity constant $k_1$ of splitting off a Cl from $CCl_4$ is significantly smaller than the reaction velocity constant $k_2$ of splitting off the Br from $CCl_3Br$. $CCl_4$ requires very much greater decomposition energies to start the reaction according to the invention and therefore results in poor yields in the manufacture of compounds of formula I. Under the conditions here mentioned, of a mild reaction of trichlorobromomethane, R—OH and $R_3$—X—$P(OR_4)(OR_5)$, it can serve as an almost inert solvent or diluent.

The process of the present invention is advantageously carried out at a reaction temperature within the range of from 0° to 100°C, preferably 15° to 50°C.

R can be substituted by a variety of substituents, for example by one or more halogen atoms, nitro groups, aliphatic radicals including also $CF_3$, carbalkoxy, carboxyamido, sulphonyl and amino groups. Fundamentally, however, the substituents should not have a determining effect on the course of the reaction.

The process of the present invention provides a means of manufacturing, in a simple manner, phosphoric acid esters and phosphonic acid esters which were hitherto obtained in an involved manner from the phosphoric acid ester halides or phosphoric acid ester halides respectively and the compounds of formula R—OH, in the presence of an agent which binds hydrogen halide.

New and known phosphoric acid esters and phosphonic acid esters having a pesticidal action can be manufactured according to the new process.

The following Examples illustrate the invention:

EXAMPLE 1

O,O-Diethyl-(2,4,5-trichlorophenyl)-phosphate 5 g of triethylphosphite were added with stirring to a mixture of 29.6 g of 2,4,5-trichlorophenol and 40 cc of bromotrichloromethane. After some minutes the temperature had risen from 15° to 30°C. A further 20.6 g of triethylphosphite were then added dropwise to the reaction mixture during 30 minutes with constant stirring and cooling. The temperature was kept at between 30° to 40°C. After completion of the dropwise addition the reaction mixture was stirred for a further 3 hours.

The volatile constituents were distilled off and the residue was kept for one hour at 80°C/0.02 mm Hg.

50 g of a yellowish oil were left (yield: 100 % of theory), $n_D^{35}$: 1.5120; boiling point 108 to 115°C/0.01 mm Hg.

The product has the following composition:

| For $C_{10}H_{12}Cl_3O_4P$ | | |
|---|---|---|
| | calculated | found |
| % P | 9.29 | 9.3 |
| % Cl | 31.89 | 32.0. |

Other phenylphosphates can be manufactured in the same manner as described in Example 1, for example
O,O-Dimethyl-O-(2,4,5-trichlorophenyl)-phosphate
   boiling point 120° to 122°C/0.1 mm Hg
O,O-Dimethyl-O-(2,5-dichlor-4-iodophenyl)-phosphate
   melting point 58° to 59°C O,O-Diethyl-O-(2,5-dichloro-4-iodophenyl)-phosphate
  boiling point 138° to 140°C/0.001 mm Hg
O,O-Dimethyl-O-(2,5-dichloro-4-bromophenyl)-phosphate
  melting point 64°C
O,O-Diethyl-O-(2,5-dichloro-4-bromophenyl)-phosphate
  $n_D^{25}$ 1.5249
O,O-Diethyl-O-(4-nitrophenyl)-phosphate
  boiling point 118°C/0.1 mm Hg
O,O-Dimethyl-O-(2,4-dichlorophenyl)-phosphate
O,O-Dimethyl-O-(2-chloro-4-tert.butylphenyl)-phosphate
O,O-Diethyl-O-(2,4,6-trichlorophenyl)-phosphate
O,O-Dimethyl-O-(4-cyanophenyl)-phosphate
O,O-Dimethyl-O-(3-methyl-4-methylmercapto-phenyl)-phosphate
  boiling point 110°C 0.001 mm Hg
O,O-Dimethyl-O-(4-trifluoromethylphenyl)-phosphate
O,O-Dimethyl-O-(3-chloro-4-trifluoromethylphenyl)-phosphate and
O,O-Dimethyl-O-(3-trifluoromethyl-4-chlorophenyl)-phosphate.

If in place of O,O,O-trialkylphosphite alkyl-O,O-dialkylphosphite (with any desired $C_1$-$C_4$-alkyl radicals) is used, the corresponding phenylphosphonates are obtained, for example methyl-O-methyl-O-(2,5-dichlor-4-iodophenyl)-phosphate, ethyl-O-methyl-O-(2,5-dichlor-4-iodophenyl)-phosphate and ethyl-O-ethyl-O-(4-nitrophenyl)-phosphate.

Phenylphosph(on)ates of less simple structure are also obtainable without difficulties in the same manner, for example

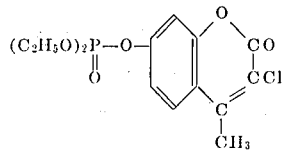

Melting point, 65° C.

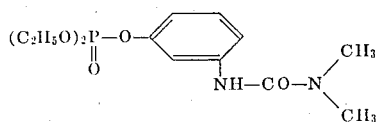

Melting point, 93° C.

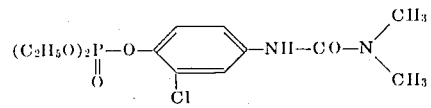

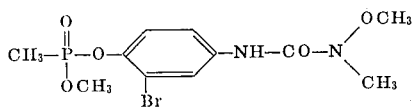

EXAMPLE 2

O,O-Diethyl-(benzoxazol-2-yl)-phosphate 33.3 g of triethylphosphite were added dropwise during 50 minutes, whilst stirring, to a suspension of 27.2 g of benzoxazolone in 40 cc of bromotrichloromethane. The temperature was kept at 30° to 40°C by cooling. After the end of the dropwise addition, the reaction mixture was stirred for a further hour.

The volatile constituents were distilled off and the residue was kept for one hour at 70°C/0.02 mm Hg. 53 g (97.5 % of theory) of a brown-reddish oil were left. $n_D^{23}$ : 1.5090

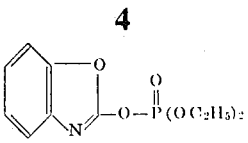

The product has the following composition:

| For $C_{11}H_{12}NO_3P$ | | |
| --- | --- | --- |
| | calculated | found |
| % P | 11.42 | 11.4 |
| % N | 5.16 | 5.3. |

Any desired phosph(on)ates with heterocyclic substituents can be manufactured in a similar manner to that described in Example 2, for example

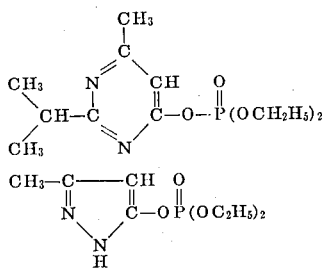

Boiling point 107 to 109° C. at 0.1 mm. Hg.

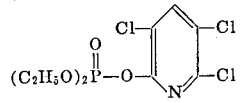

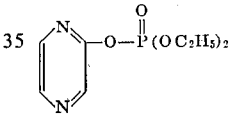

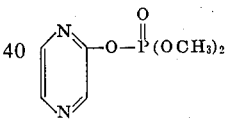

EXAMPLE 3

O,O-Diethylphosphoryl-acetonoxime 16.6 g of triethylphosphite, 5.9 g of acetonoxime and 40 g of bromotrichloromethane was brought together whilst stirring. An exothermic reaction immediately occurred. The temperature of the reaction mixture was kept below 50°C by cooling. After completion of the exothermic reaction, the reaction mixture was stirred for a further hour.

The volatile constituents were distilled off and the residue was kept for one hour at 60°C/0.01 mm Hg.

20.9 g (100 % of theory) of a yellowish oil were left:

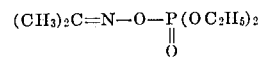

The crude product was distilled over on a molecular distillation apparatus.

The product boils at 80°C/0.04 mm Hg and has $n_D^{24.5}$: 1.4355.

The distilled product has the following composition:

| For $C_7H_{16}NO_2P$ | | |
| --- | --- | --- |
| | calculated | found |
| % P | 14.81 | 14.7 |

Any desired other oximephosphates are obtainable in a similar manner to that described in Example 3, for example

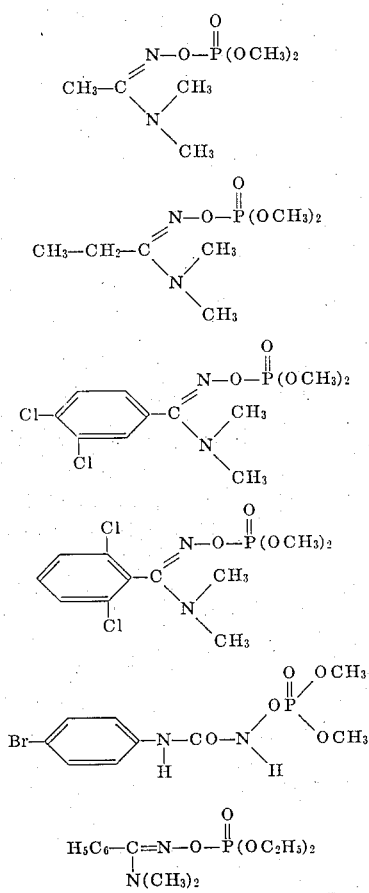

EXAMPLE 4

Diethylphosphoryl-α-oximino-phenylacetonitrile 16.6 g of triethylphosphite were run into a suspension of 14.6 g of α-cyanobenzaldoxime in 50 cc of BrCCl₃ during 30 minutes, whilst stirring. The temperature was kept below 40°C by cooling. The reaction mixture was then stirred for a further hour at room temperature.

The volatile constituents were pre-distilled and the crude product was kept for 1 hour at 60°C/0.02 mm Hg.

28.5 g of a yellowish oil were left; $n_D^{22}$ : 1.5149.

The product has the formula

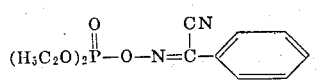

Analysis for $C_{12}H_{15}N_2O_4P$

|      | calculated | found |
|------|------------|-------|
| % P  | 10.97      | 10.1  |

The following oximephosph(on)ates can also be manufactured in a similar manner to that described in Example 4:

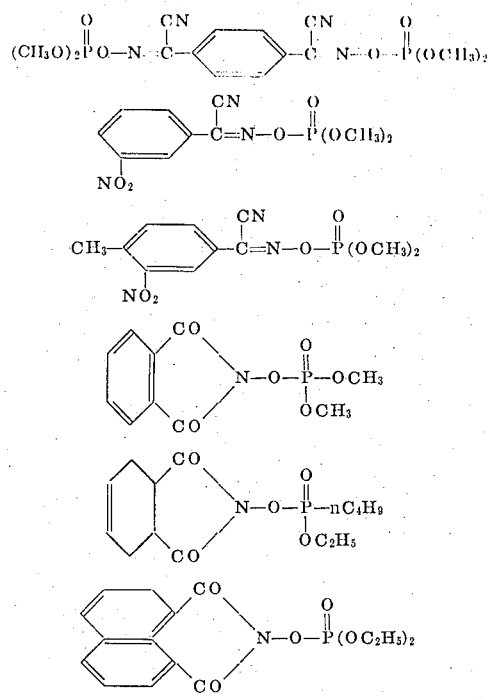

EXAMPLE 5

If equimolecular amounts of trimethylphosphite, trichlorobromomethane and acetoacetic acid dimethylamide are reacted in accordance with the manner indicated in the preceding Examples, the compound of formula

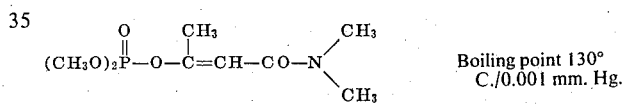  Boiling point 130° C./0.001 mm. Hg.

(molecular distillation) is obtained. Other phosph(on-)ates derived from aliphatic esters or acid amides can also be manufactured in a similar manner, for example

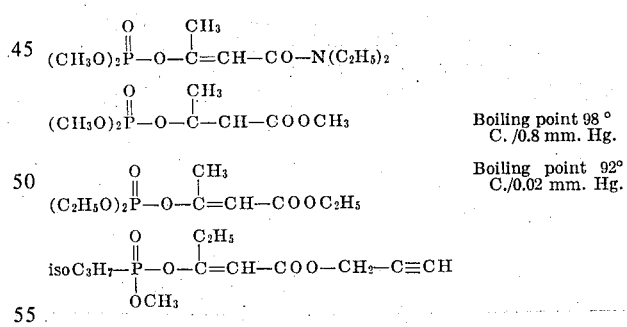

Boiling point 98° C./0.8 mm. Hg.

Boiling point 92° C./0.02 mm. Hg.

We claim:
1. A process for preparing phosphoric acid esters of the formula

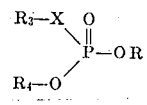

wherein
each of $R_3$ and $R_4$ represents $C_1-C_4$ alkyl,
X represents oxygen or the direct P—$R_3$ bond, and
R represents phenyl or phenyl substituted by a radical selected from the group consisting of alkyl, halogen, nitro, cyano, alkylmercapto, trifluoromethyl and ureido substituted by alkyl, alkoxy or halophenyl; the residue of the formula

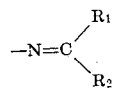

in which $R_1$ represents $C_1$-$C_4$ alkyl, phenyl or phenyl substituted by halogen or nitro, and $R_2$ represents hydrogen, phenyl, alkylamino, dialkylamino or cyano; a heterocyclic residue containing 5 or 6 ring members and having optionally one or two benzene rings fused thereon, which residue may be substituted by alkyl or halogen; or the radical of an enolised aliphatic keto compound of the formula

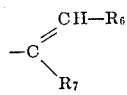

wherein one of $R_6$ and $R_7$ represents alkyl, carbalkoxy or carboxamide and the other represents carbalkoxy or carboxamide,
which process comprises reacting (1) a phosphorus compound of the formula

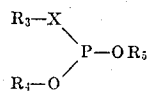

wherein $R_5$ represents $C_1$-$C_4$ alkyl, with (2) trichlorobromomethane and (3) a compound of the formula

R — OH.

2. A process according to claim 1 in which R represents the radical of an enolised aliphatic keto compound of the formula

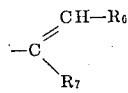

wherein one of $R_6$ and $R_7$ represents alkyl, carbalkoxy or carboxamide and the other represents carbalkoxy or carboxamide.

3. A process according to claim 1, wherein trichlorobromomethane is employed in at least stoichiometrically equivalent amounts relative to each of the other two reagents.

4. A process according to claim 1, wherein the reaction is carried out in the presence of one or more solvents which are free of hydroxyl groups.

5. A process according to claim 1, wherein the reaction is carried out at a temperature within the range of from 0° to 100°C.

6. A process according to claim 5, wherein the reaction is carried out at a temperature within the range of from 15° to 50°C.

* * * * *

UNITED STATES PATENT OFFICE
CERTIFICATE OF CORRECTION

Patent No. 3,857,907                    Dated December 31, 1974

Inventor(s) Henry Martin and Jozef Drabek

It is certified that error appears in the above-identified patent and that said Letters Patent are hereby corrected as shown below:

The following should appear in the heading:

Assignee: CIBA-GEIGY AG, Basel, Switzerland

Signed and sealed this 1st day of April 1975.

(SEAL)
Attest:

RUTH C. MASON
Attesting Officer

C. MARSHALL DANN
Commissioner of Patents
and Trademarks